(12) United States Patent
Allpress et al.

(10) Patent No.: US 8,554,597 B2
(45) Date of Patent: Oct. 8, 2013

(54) PERFORMANCE MANAGEMENT SYSTEM

(76) Inventors: Keith Neville Allpress, Auckland (NZ); Leanne Helen Markus, Auckland (NZ)

( * ) Notice: Subject to any disclaimer, the term of this patent is extended or adjusted under 35 U.S.C. 154(b) by 536 days.

(21) Appl. No.: 12/534,602

(22) Filed: Aug. 3, 2009

(65) Prior Publication Data

US 2009/0307064 A1 Dec. 10, 2009

Related U.S. Application Data

(63) Continuation of application No. 10/480,334, filed as application No. PCT/NZ02/00112 on Jun. 17, 2002, now abandoned.

(30) Foreign Application Priority Data

Jun. 15, 2001 (NZ) ........................................ 512390

(51) Int. Cl.
    *G06Q 10/00* (2012.01)
(52) U.S. Cl.
    USPC ........... 705/7.12; 705/7.13; 705/321; 706/11; 706/45; 706/46
(58) Field of Classification Search
    None
    See application file for complete search history.

(56) References Cited

U.S. PATENT DOCUMENTS

| 4,386,266 | A |   | 5/1983  | Chesarek       |          |
|-----------|---|---|---------|----------------|----------|
| 4,413,277 | A |   | 11/1983 | Murray         |          |
| 5,416,694 | A |   | 5/1995  | Parrish et al. |          |
| 5,999,908 | A | * | 12/1999 | Abelow         | 705/7.32 |
| 6,119,097 | A | * | 9/2000  | Ibarra         | 705/7.42 |
| 6,157,808 | A | * | 12/2000 | Hollingsworth  | 434/350  |
| 6,275,812 | B1| * | 8/2001  | Haq et al.     | 705/7.14 |
| 7,133,834 | B1| * | 11/2006 | Abelow         | 705/7.32 |
| 7,155,399 | B2| * | 12/2006 | Andre et al.   | 705/7.14 |
| 7,155,400 | B1| * | 12/2006 | Jilk et al.    | 705/7.14 |
| 7,181,413 | B2| * | 2/2007  | Hadden et al.  | 705/7.42 |
| 7,254,546 | B1| * | 8/2007  | Andre et al.   | 705/7.14 |
| 7,620,565 | B2| * | 11/2009 | Abelow         | 705/7.32 |
| 7,729,935 | B2| * | 6/2010  | Theiler        | 705/7.27 |
| 7,769,617 | B2| * | 8/2010  | Iwasaki et al. | 705/7.26 |

(Continued)

FOREIGN PATENT DOCUMENTS

| WO | WO 01/25971 | * | 4/2001 | ........................ 17/30 |
| WO | WO 02/27571 |   | 4/2002 |  |

OTHER PUBLICATIONS

Fowler P and Rifkin S (1990). Software Engineering Process Group Guide. Software Engineering Institute. Sep. 1990. pp. 1-159.*

(Continued)

*Primary Examiner* — Gurkanwaljit Singh
(74) *Attorney, Agent, or Firm* — Young & Thompson

(57) ABSTRACT

A computerised method of managing the performance of an employee or a group of employees of an organisation, the method comprising the steps of: a) creating a job description containing job description data for an employee or group of employees, b) creating an objectives file containing objectives data relating to objectives to be achieved by the employee or group of employees in the performance of their job description, c) processing of the job description data and the objectives data to obtain defined performance expectation data for employee or group of employees, d) receiving performance data obtained from the organisation relating to the performance of employee or group of employees, e) comparing the performance data with the defined performance expectations data and f) creating and/or modifying a development plan for the employee or group of employees.

26 Claims, 4 Drawing Sheets

(56) References Cited

U.S. PATENT DOCUMENTS

| | | | |
|---|---|---|---|
| 7,805,382 | B2 * | 9/2010 | Rosen et al. ............... 705/321 |
| 7,937,281 | B2 * | 5/2011 | Miller et al. ............... 705/7.12 |
| 8,200,527 | B1 * | 6/2012 | Thompson et al. ......... 705/7.39 |
| 2002/0040313 | A1 * | 4/2002 | Hunter et al. ................. 705/9 |
| 2002/0055866 | A1 * | 5/2002 | Dewar ........................... 705/8 |
| 2002/0077884 | A1 * | 6/2002 | Sketch .......................... 705/12 |
| 2002/0156674 | A1 * | 10/2002 | Okamoto et al. ............. 705/11 |
| 2003/0139955 | A1 * | 7/2003 | Kirii et al. ..................... 705/7 |
| 2003/0177027 | A1 * | 9/2003 | DiMarco ........................ 705/1 |
| 2003/0233278 | A1 * | 12/2003 | Marshall ....................... 705/14 |
| 2004/0117046 | A1 * | 6/2004 | Colle et al. ................... 700/99 |
| 2004/0133889 | A1 * | 7/2004 | Colle et al. .................. 718/100 |
| 2004/0138939 | A1 * | 7/2004 | Theiler ........................... 705/8 |
| 2004/0158568 | A1 * | 8/2004 | Colle et al. .................. 707/100 |
| 2005/0119928 | A1 * | 6/2005 | Deitrich et al. ................. 705/9 |
| 2005/0119929 | A1 * | 6/2005 | Deitrich et al. ................. 705/9 |
| 2005/0159968 | A1 * | 7/2005 | Cozzolino ...................... 705/1 |
| 2006/0229896 | A1 * | 10/2006 | Rosen et al. ................... 705/1 |
| 2007/0192157 | A1 * | 8/2007 | Gooch ............................ 705/9 |
| 2008/0027783 | A1 * | 1/2008 | Hughes et al. ................. 705/9 |
| 2008/0201167 | A1 * | 8/2008 | Eggenberger-Wang et al. . 705/2 |
| 2008/0243581 | A1 * | 10/2008 | Jennings ........................ 705/9 |
| 2009/0204470 | A1 * | 8/2009 | Weyl et al. ..................... 705/9 |

OTHER PUBLICATIONS

Cochran, J.K.; Chu, D.E.; Chu, M.D; "Optimal Staffing for Cyclically Scheduled Processes", International Journal of Production Research, 1997, pp. 3393-3403.*

"Global Knowledge Network to Provide Deutsche Telekom Customers and Employees with Competency-based SAP Training," PR Newswire, Nov. 24, 1998.*

Silvia T. Acuna, Angelica De Antonio, Xavier Ferre, Marta Lopez and Luis Mate. The Software Process: Modelling, Evaluation and Improvement. Handbook of Software Engineering and Knowledge Engineering vol. 0, No. 0 (2000) World Scientific Publishing Company. pp. 1-35.*

* cited by examiner

PERFORMANCE MANAGEMENT SYSTEM

FIELD OF INVENTION

This invention relates to management systems, methods and apparatus. More particularly, the invention relates to organisational performance management and human resource management systems or methods.

BACKGROUND

Efficient and effective performance management is of increasing importance in today's working culture. There are various systems in existence, most of which relate only to one specific management theory and are often piecemeal in their approach. Performance may be managed on the basis of prescription, that is required actions and behaviours may be specified, and it may also be measured on the basis of results. In this case the required outcomes are defined and less specification of tasks, behaviours or competencies is provided. Neither approach on its own is satisfactory, prescribed behaviours may not produce the desired results, and equally where required outcomes are specified the means used to achieve these may not be consistent with the organisation's values and policy.

To date most systems evaluate performance by setting objectives for an employee to meet and then measuring the employee's ability to meet those objectives. This approach is too simplistic and fails to provide a proper account of an employee's total job performance, as measured by satisfaction of all job accountabilities, responsibilities and tasks as well as the individual objectives. In addition to the above most systems are paper based, or are stored as discrete electronic files and have no interconnection with each other, or with other systems. Documents typically stored include job descriptions, job analyses, person specifications, individual objectives, performance reviews, individual development plans and the like.

These prior art filing systems are inconvenient to update and do not maintain dynamic links to individual employees or to performance management resources. In modern organisations performance expectations change frequently and need to be continually updated.

There have been advances in developing software-implemented systems for performance management. Some existing systems generate job descriptions from static libraries of responsibilities and tasks, but do not allow the linking of employees by use of the main human resource system, nor do they allow the use and moderation of dynamic libraries. There are systems that perform job analyses using various methods, but fail to provide links automatically to job descriptions or person specifications.

There are existing systems for 360-degree performance surveys for standard organisational competencies. Such systems are prone to providing subjective data, and lack sophisticated design control to improve validity. None of the 360-degree performance surveys integrate with all the aspects of individual job performance or the monitoring of organisational performance data from other systems. In addition these survey systems have limited statistical analysis.

A further problem with current systems is that the entire performance review process is often institutionalised as an annual or biannual event with little ongoing performance review.

In addition there have been no systems to date which incorporate performance diagnostics.

Existing electronic systems display a limited range of information on individual performance—a spotlight effect. There are no existing electronic performance management systems that place all aspects of individual and team performance within a single field of view.

There is a need for a system, which provides a totally integrated resource for organisations to manage the performance of individuals, teams and larger organisational entities. This system needs to facilitate the clear statement of all job related performance expectations, including what should be done, how performance is to be measured, and the expected results. The system needs to record and link such expectations to monitoring and recording of actual performance in a range of ways, and provide a means for using this information to review and develop performance. Additionally this system needs to provide senior and human resource managers with information as to the integrity of the performance management process, that it is occurring, and that it is being carried out correctly. Introduction of such an integrated performance management system constitutes a major change in organisational culture. The system needs to have sophisticated access control functionality to enable introduction of effective performance monitoring and feedback in a graduated manner

OBJECT

It is the object of the present invention to provide an improved electronic management system or at least one which will provide the public with a useful choice.

STATEMENT OF INVENTION

In one aspect the invention provides a method of managing the performance of an employee or group of employees comprising the steps of:
 (a) defining performance expectations of an employee or group of employees by,
  creating a job description,
  setting objectives to be achieved by the employee or group of employees in the performance of their job description,
 (b) monitoring performance of an employee or group of employees by analysing performance data on the employee or group of employees with reference to the job description and objectives set.

Preferably the performance data is obtained from the organisation and/or other stakeholders.

Preferably the method of managing the performance of the employee or group of employees further includes the step of reviewing the performance of the employee or group of employees and creating or modifying a development plan for the employee or group of employees.

Preferably the job description comprises a list of responsibilities, tasks, key performance indicators, expected results, purpose, title and special considerations.

More preferably the job description is associated with a person specification and is assigned to an employee or group of employees.

Preferably the job descriptions are analysed by using competency dimensions and data obtained from one or more surveys to identify key tasks, obtain job evaluations and determine competency requirements.

Preferably the step of defining the expectation of performance additionally includes the step of selecting and creating tools for selecting a candidate for a specific job based on the job description and competencies.

Preferably there is a step where objectives are agreed between employees and managers.

Preferably the objectives agreed are individual objectives based on the tasks and responsibilities in the job description and organisational objectives created by the organisation.

More preferably the objectives are weighted and prioritised and are associated with measures and expected results.

Preferably the performance monitoring step includes a survey process.

Preferably the performance review process includes a performance diagnosis instrument.

In a further aspect the present invention provides an integrated management system for the management of human resources, said management system including sub-systems of: 1) performance definition, 2) performance monitoring and 3) performance development, wherein the performance definition subsystem includes a job description module, a job analysis module and an objective-setting function.

Preferably the performance definition system additionally has a tool selection module.

Preferably the tool selection module provides links from individual job descriptions to suitable assessment instruments for selecting candidates best suited to the job description.

Preferably the job description module creates job descriptions and identifies competencies for each job or role.

Preferably the competencies are used to produce person specifications for each job or role. Preferably the job descriptions and person specifications are created using organisational and employee data, competency dimensions and the responsibilities and tasks for that job.

Preferably the job description module automatically generates job descriptions of new and existing positions.

Preferably the job description module allows different users different levels of function depending on the role of the user.

Preferably the job description module provides means for linking individual employees to job descriptions and person specifications and means for removing them.

Preferably the job description module provides means for searching for job descriptions already in the system.

Preferably the job description module includes an editing function.

Preferably the job description module uses status and version control to control the proliferation, quality and use of job descriptions Preferably the job analysis module includes task analysis, competency analysis and job evaluation functions.

Preferably the task analysis function t enables identification, categorisation, recording and display of key responsibilities and tasks in a role, prior to creation of a formal job description.

Preferably the competency analysis function includes a survey function which enables identification, recording and display of skills, actions and behaviours required for particular responsibilities and tasks.

Preferably the job evaluation component is a survey which gathers and analyses data needed for decisions on compensation for jobs and positions, according to multiple criteria.

Preferably the objective-setting function records agreement of individual, team and organisational objectives.

Preferably the objective-setting function enables the viewing, drafting, editing, recording, display and approval of objectives at various levels.

Preferably the objective-setting function links objectives to responsibilities in the job description and to objectives of the parent organisational unit.

Preferably the objective-setting function prioritises and weights objectives.

Preferably the performance definition subsystem uses status and version control for records entering the database.

Preferably the performance monitoring sub-system consists is a performance database comprising a performance diary, a survey module with survey construction and survey distribution functions and an analysis and reporting function.

Preferably the performance diary captures and displays information, clearly showing its direct relationship to all performance expectations of employees or groups of employees.

Preferably the information is obtained from external corporate databases, and by direct entry from within the organisation by employees and managers, and from survey data.

Preferably the survey module enables the construction and distribution of 360-degree survey instruments.

Preferably the survey module enables viewing, selection, editing and creation of library survey instruments, from survey items and response scales, to gain feedback on particular responsibilities, tasks or objectives for individual employees or groups of employees within the Organisation.

Preferably the survey distribution function enables selection of survey respondents, from all appropriate stakeholders of the organisation, internal and external, distributes, collects and consolidates the survey results.

Preferably the analysis function interprets the survey results and provides reports.

Preferably individual survey reports are displayed in the performance diary.

Preferably the performance monitoring subsystem includes a reporting functionality for individual, team and organisational performance.

Preferably the performance development subsystem includes a performance diagnostics component, a performance review component which records comments and ratings of individual performance and updates performance expectations.

Preferably the performance development subsystem also includes a development planning component which sets and updates development plans for individuals/teams and organisational units Preferably the performance development module includes a performance diagnosis function which enables identification of causes of performance problems and recommendation of appropriate remedial actions.

Preferably the performance development subsystem has means for receiving data from the performance definition means and performance monitoring means and displays the data to users.

Preferably the performance definition, performance monitoring and performance development sub-systems are capable of being integrated with existing human resource systems.

Preferably the management system is capable of communicating with external corporate databases.

Preferably a user communicates with the system using a graphical user interface on a user terminal.

In a further aspect the present invention provides a performance management system having:

a) a centralised or distributed database and database management system that may be secured and maintained in state of data integrity, b) centralised or distributed application software, to implement the necessary functions of the performance management system by interaction with the database and by interaction with a community of registered users, c) system distribution access means to allow access to a user base, the access means being capable of transmitting user requests, and responses across the network, d) personal computers or user terminal devices equipped with client software that are of sufficient interactivity to permit the authentication of users, and for users to effect the necessary selections and choices in order to select and perform functions delivered by the system.

Preferably database and database management system is secured and maintained in state of data integrity.

Preferably the system distribution access means is secured via a secured network system.

Preferably the system can be implemented on such platforms by variation.

BRIEF DESCRIPTION OF DRAWINGS

Embodiments of the invention will now be described by way of example only, with reference to the accompanying drawings of which.

PREFERRED EMBODIMENT

Figure 1:
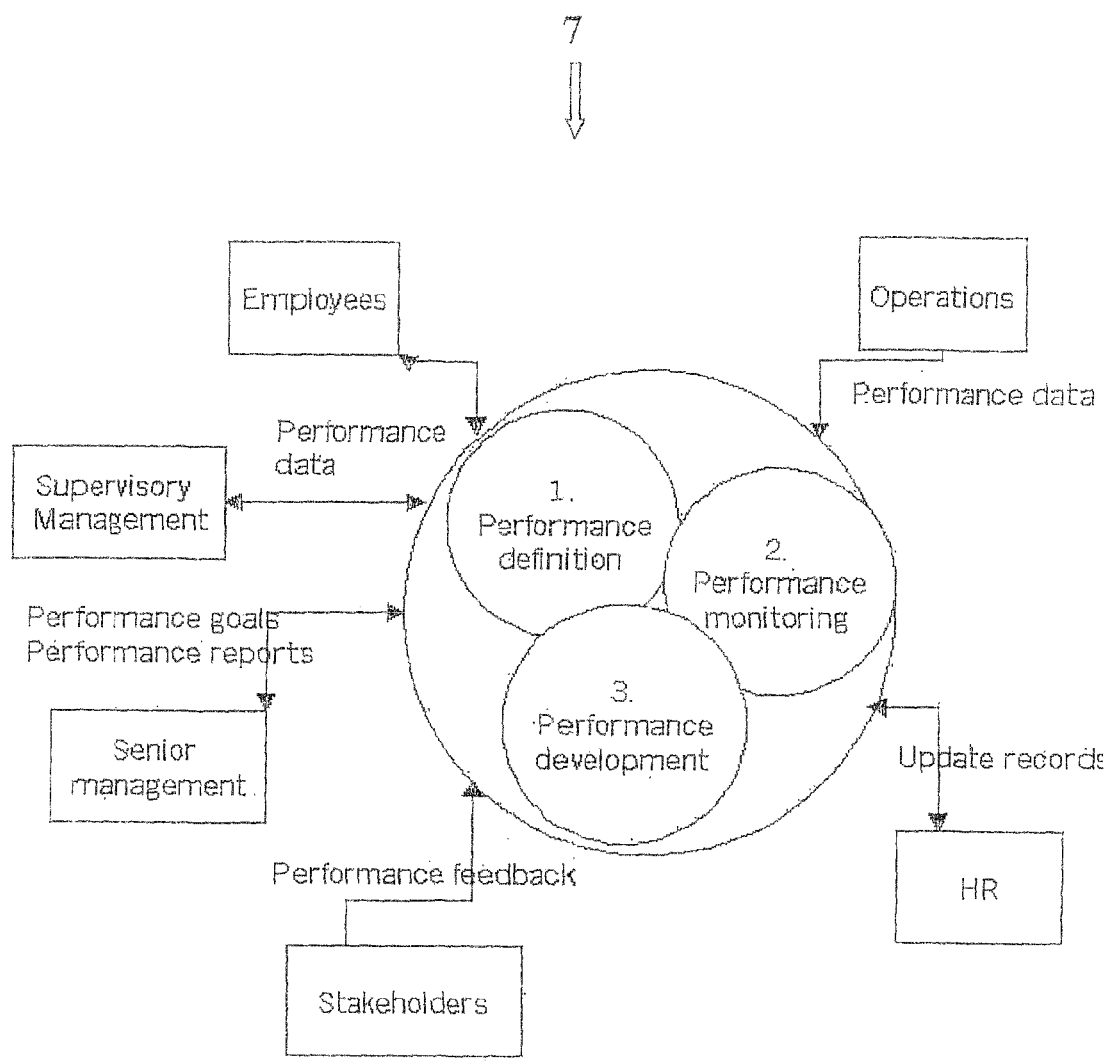
FIG. 1 is a schematic flow diagram showing a preferred embodiment of the performance management system.

The present invention provides a multidimensional management system for electronic use in managing work performance.

The following examples are given by way of illustration only and shall not be taken as being in any way limiting as to the spirit or scope of the invention.

An "employee or group of employees" in the description is intended to cover individuals, organisations, any entity or group of entities or a combination thereof.

Referring to the drawings, wherein like numerals designate corresponding parts throughout the several figures.

Referring to FIG. 1 it can be seen that the management system of the present invention comprises subsystems:
1. the performance definition subsystem 8,
2. the performance monitoring subsystem 21, and
3. the performance development subsystem 30.

The sub-systems are adapted to enable interaction with human resources 20, employees, supervisors, stakeholders as well as management personnel.

The levels of access given to each person will vary depending on their position however. For example a supervisor will have greater access to the system than an employee; a manager will have greater access to the system than a supervisor and so on.

1. Performance Definition Subsystem

Figure 2:
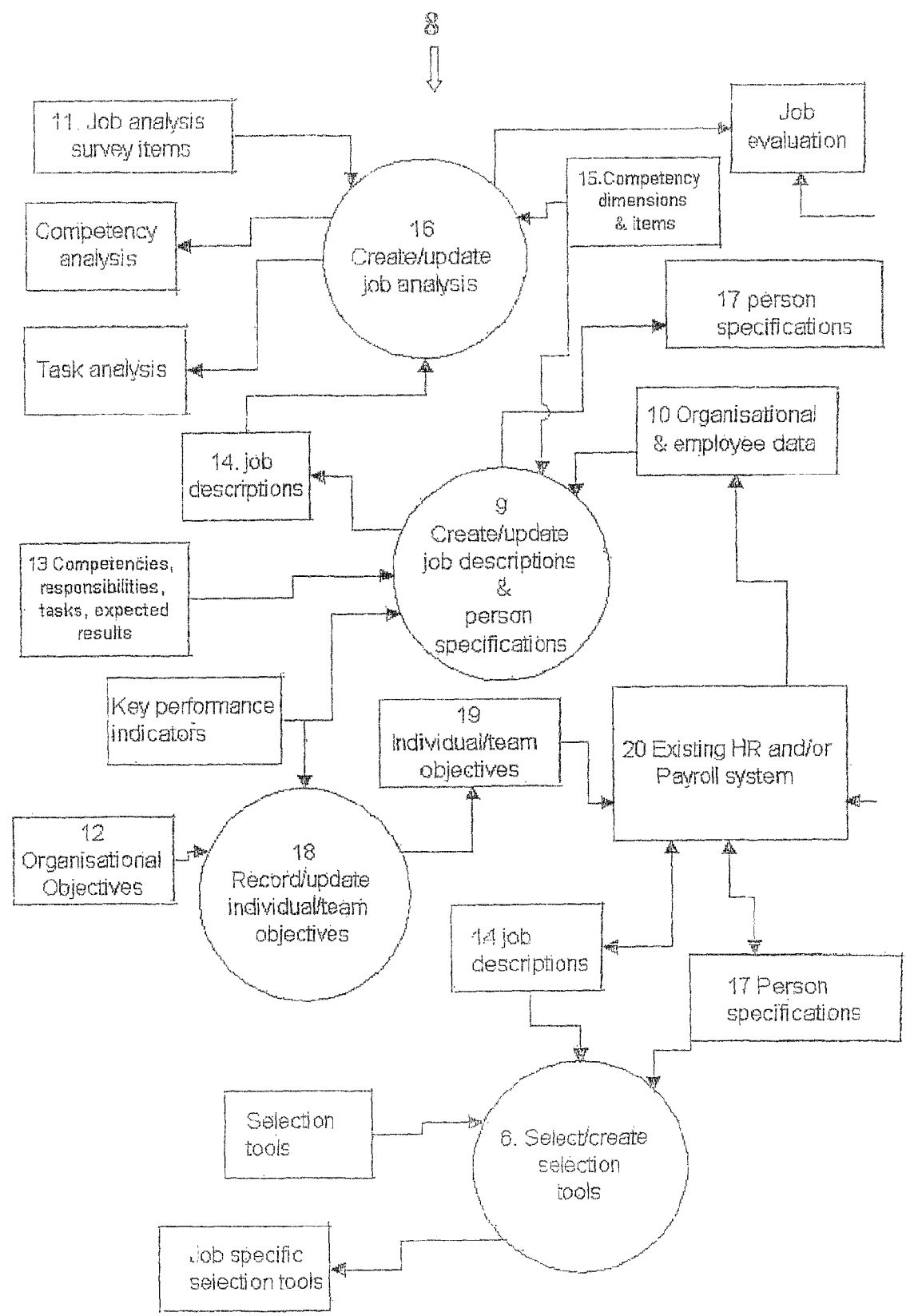
FIG. 2 is a schematic flow diagram showing the performance definition means of the invention.

The performance definition subsystem 8 can best be seen in FIG. 2. and in use, will be accessed by selecting the region indicating this subsystem. The performance definition subsystem includes a job description module 9, a job analysis module 16 and an objective-setting function 18.

The job description module 9 comprises a dynamic database containing information on job competencies, accountabilities, responsibilities, tasks, expected results 13 and key performance indicators. In addition it contains organisational data 10 including job titles, organisational units, relationships with stakeholders inside and outside the organisation, and employee data obtained from the existing human resources system 20.

The job description module 9 utilises a build function incorporating information on the database to automatically generate job descriptions 14, which can be adapted for new or amended positions. The job description 14 contains information on job title, purpose, special considerations, and performance expectations; that is competencies, accountabilities, responsibilities, tasks key performance indicators and expected results.

Person specifications 17, which are associated with the job description 14, are built using survey items to identify competency dimensions, including but not limited to, knowledge, education, experience, skills, abilities and personal attributes required for the job. Person specifications 17 allow the recording of this information for each employee or group of employees. Such information may be automatically linked to employee records on the existing Human Resources System 20. Information on the Human Resources System 20 is thereby continuously updated. It should be noted that the job description module 9 is capable of generating multiple versions of person specifications. 17 associated with one particular job description 14.

It is preferable the job description module 9 utilises status and version control functions to control proliferation and adaptation of job descriptions and person specifications. The module 9 will preferably include an assignment function to enable association, and disassociation, of employees with the job description 14 and person specifications 17.

The job description module provides a display to users, for example, displaying individual job descriptions and person specifications, or job descriptions and person specification by position, or job descriptions and person specifications for staff. As mentioned above different users will have different access rights to view the display and to enter and edit information depending on their role within the organisation.

The job analysis module 16 consists of a database of competency dimensions and items 15 and job analysis survey items 11. Together, the competency dimensions and items 15 and job analysis survey items 11 permit evaluation of the job, and the analysis of competencies and tasks.

Task analysis enables identification, categorisation, recording and display of key responsibilities and tasks in a job prior to creation of a formal job description 14.

Competency analysis enables identification, recording, and display of skills required for particular accountabilities, responsibilities and tasks. for the purposes of training and development The objective-setting module 18 enables the recording, viewing and updating of individual, team 19 and organisational objectives 12. The objective-setting function 18 is also associated with job descriptions from the job description module 9. The objective-setting module links objectives to responsibilities in the job description 14 and to objectives in the parent organisational unit 12. The advantage of this module is that it links objectives to Key Performance Indicators a specific means of measurement and an expected outcome. The module additionally provides for objectives to be weighted and prioritised The objective setting module 18 provides the means for moderation of objectives by all appropriate parties. It also provides the means for employee agreement of their individual or team objectives in conjunction with their manager.

The selection module 6 provides links from individual job descriptions to suitable personnel assessment instruments, including psychometric tests and work sample tests. The selection module also enables the construction of structured interviews by viewing and selecting questions and rating scales relevant to particular job descriptions and person specifications.

The performance definition subsystem 8 is designed to allow interface between its own databases and external corporate databases to maintain currency of information. The system of the present invention may incorporate means for employees to indicate acceptance of the job description 14 and person specification 17.

2. Performance Monitoring

Figure 3:
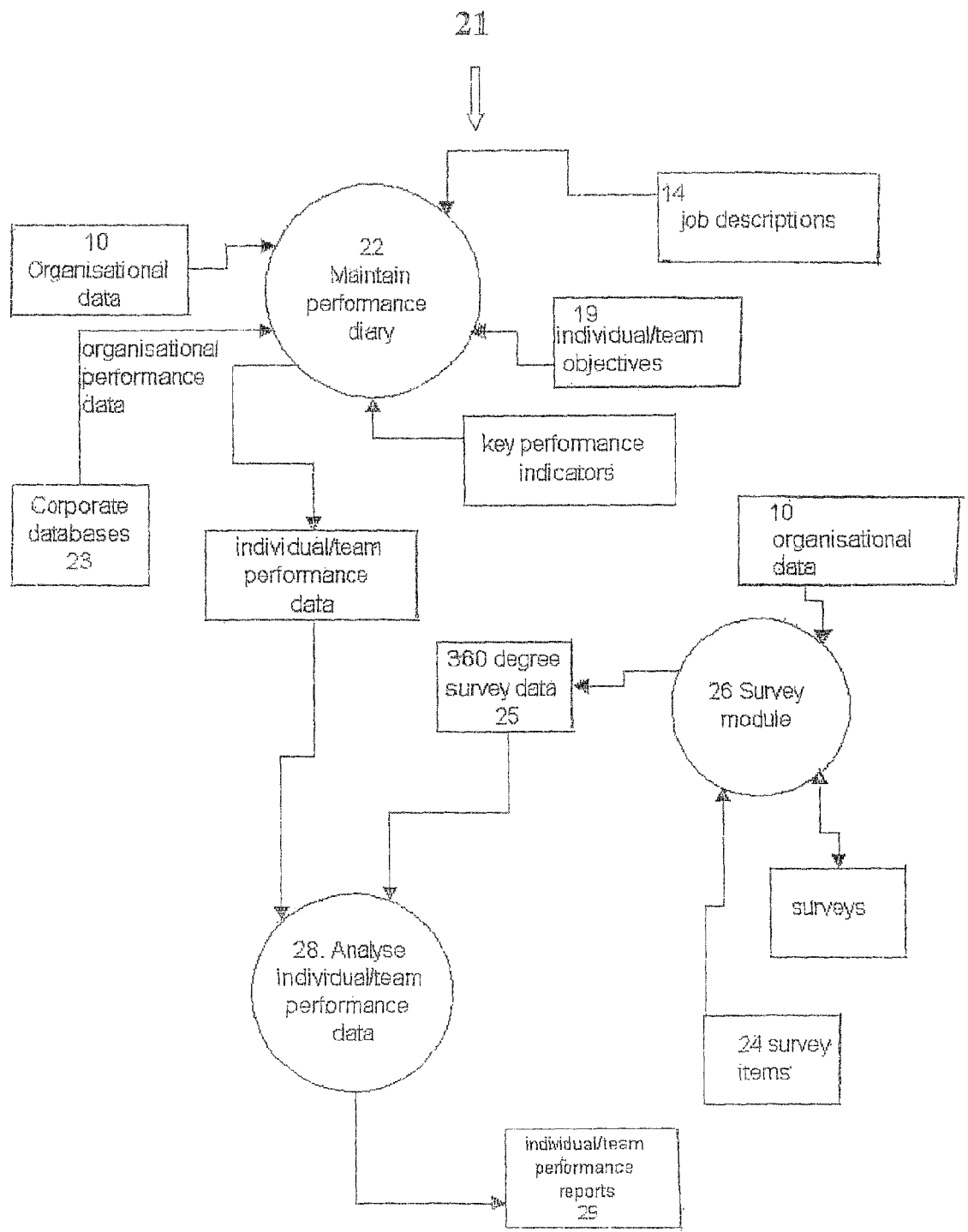
FIG. 3 is a schematic flow diagram showing the performance monitoring means of the present invention.

The performance monitoring subsystem is best seen with reference to FIG. 3, and in use, will be accessed by selecting the region marked for this subsystem.

The performance monitoring subsystem 21 references and displays performance expectations and objectives of the performance definition means 8.

The performance monitoring subsystem 21 comprises a performance diary module 22, survey items 24 with a survey construction, distribution and collection module 26 and a survey analysis and reporting function 28.

An organisational data capture function in the performance diary, captures organisational performance data of employees and groups of employees. This data comes from interfaces with external corporate databases 23, by direct entry from within the organisation by individuals and managers, and from survey information. The performance diary provides a means of ongoing informal job-specific performance review between the traditional formal performance review events.

Information on achievements, progress notes, resource issues, suggestions, 360 degree feedback and performance gaps, all displayed related to specific performance expectations, may be viewed and updated by employees or their managers.

Access and status controls are sufficient to allow an organisation to configure the system to align with their own policies and procedures on performance monitoring and feedback.

The survey module 26 enables the viewing, selection, editing and creation of library survey items and response scales directly related to competencies, accountabilities, responsibilities and tasks in the job description and/or to individual objectives in order to create a survey instrument for the purposes of obtaining feedback on selected aspects of performance. It is desirable that the survey design functionality includes various safeguards to promote survey validity and reliability. The distribution function will enable selection of survey respondents and manage distribution, collection, and consolidation of the survey results 25.

Individual survey results are shown against the related performance expectation in the performance diary 22.

The analysis function 28 provides statistical analysis at an organisational level on survey data 25. The reporting functionality compiles reports 29 and interpretation of survey results and organisational performance data.

3. Performance Development

Figure 4:
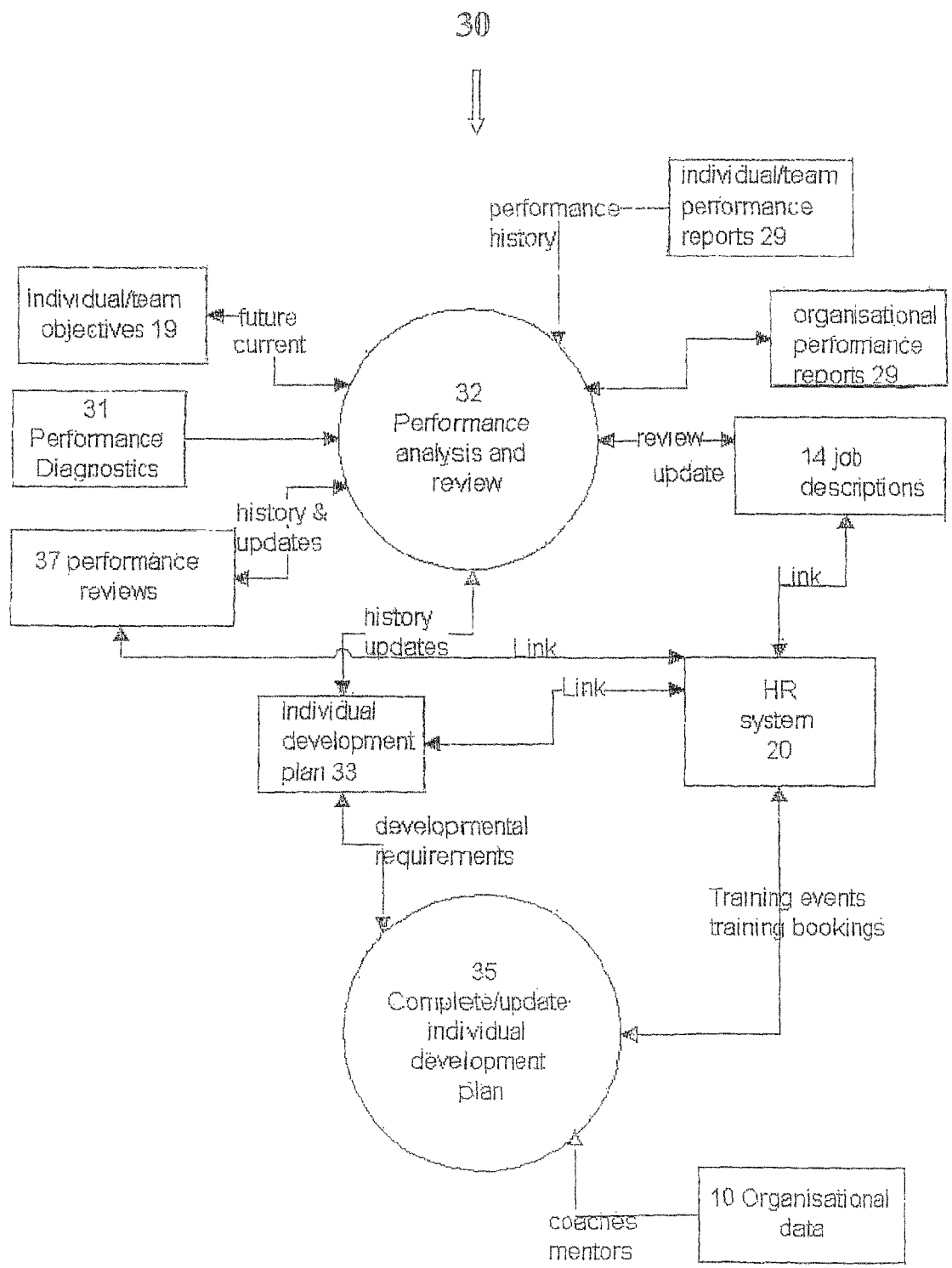
FIG. 4 is a schematic flow diagram of the performance development means of the present invention.

The performance development subsystem 30 is best-seen in FIG. 4. The performance development subsystem references and displays information from the performance definition subsystem 8 and the performance monitoring subsystem system 21. The performance development subsystem 30 consists of a performance diagnostics component 31/32, a performance review component 32 and a development module 35.

The performance diagnosis function 31/32 contains an instrument that investigates performance problems by identifying symptoms of performance problems, and linking them to the means of resolution in relevant parts of the Performance Management System 7. It also provides links to a library of organisational Human Resources policy documents and procedures.

The performance review module 32 displays performance reviews, current and historical. It collates all performance expectations—job description 14 and individual/team objectives 19 and all performance data 22 for the individual or group of employees, into an integrated display. Employees and managers review this information and enter comments and ratings on the review form.

The performance review module 32 provides the means for review by all appropriate parties prior to finalisation. It also provides the means for employee agreement of review comments and ratings in conjunction with their manager.

Provision is made to ensure face to face contact between manager and employee during the comment agreement and rating process, by requiring the employee to enter validation information, when this is a policy of the organisation.

The performance review module links to individual development plans 33, for their updating as a result of the performance review process, and to the Performance Definition subsystem for updating of performance objectives 19, and job descriptions 14.

The development module 35 links to the competency analysis in the performance definition subsystem and (external corporate) databases of training resources. The module provides a means for drafting, editing, recording and displaying resource requirements of an employee or group of employees, identified from performance monitoring and or appraisal, action plans, competency development plans, mentor and buddy arrangements, course enrolments, course completions and any other relevant developmental strategies and actions. The development module 35 provides individual development plans 33 and is linked with the existing Human Resources System. The development module is continuously updated with organisational data 10 as well as input from the Human Resources System 20. The system may also include a means to notify payroll of satisfactory performance for movement through pay grades.

It is desirable the system 7 of the present information will contain access control functions including a permissions hierarchy, password access, activity logging, intrusion detection, as well as data encryption.

The system 7 of the present information may also contain a scheduling functionality. Users will be able to diarise tasks, monitor user performance management activities, and automatically generate reminders according to programmed criteria. For example an automated calendar function to enable alarms for overdue activities using process flow "in box" notifications by email and multimedia messaging as well as within the system. Errors within the system can similarly be brought to support staff attention in this way.

Provides a means for Human Resource staff to obtain regular reports and on demand information on system usage and performance management activity throughout the organisation.

The system generates fully formed documents, using templates consistent with the organisation's standards and with content appropriate for the user role.

The administration module of the present invention provides a means for Human Resource staff to update user details, to update library records, to update system configurations such as cycle lengths, moderation and approval procedures, email notifications and reminders.

A search function is preferably implemented to enable a user to quickly obtain whatever information they require.

The system may also incorporate a discussion group drop box, bulletin board and chat facilities for users, both intra and inter client.

The database is organised so that generic information pertaining to generic job descriptions, competencies, generic organisational objectives, generic performance indicators and generic survey items may be segregated from personal information.

The system allows the corpus of generic information to be expanded dynamically through system use, across multiple organisations, without compromising the integrity or privacy of personal information.

The system incorporates an extensive on line context sensitive Help system which provides information on system functionality, acceptable use and performance management procedures.

Any field of view pertaining to a particular employee or group of employees may be marked and subsequently accessed by the system user, subject to the usual security access controls. The advantage is that users can mark a set of preferred or frequently used fields of views for ease of use and rapid access.

Advantages

The present invention provides a management system that combines all the necessary human resource systems into one integrated system and is comparatively easy to use.

The present invention provides for management functions to be performed automatically. For example, automatic build/maintain function, job description construction, job analysis construction. This will alleviate the administrative burdens seen in conventional systems.

The present invention also allows for the databases to be dynamic in nature, enabling the information to be as current and accurate as possible.

The survey/performance monitoring is also superior to that found in the prior art. The present invention provides not just for 360-degree surveys but includes organisational data as well. The methodology used in the survey optimises validity and reliability of the survey results.

The administration module of the present invention provides a means for Human Resource staff to update user details, to update library records, to update system configurations such as cycle lengths, moderation and approval procedures, email notifications and reminders.

The invention provides a means for Human Resource staff to moderate the process of creating new job descriptions, person specifications, objectives, performance feedback surveys, performance reviews and individual development plans.

The present invention allows for people of different roles to have appropriate functions available to them using different access rights.

The system is capable of maintaining comprehensive current and historical records of all performance related data for each employee or group of employees.

Variations

The present invention can be configured to be sold as a product or provided as a service.

Variations can be made to interfaces to integrate the system of the present invention with different external human resource software.

The database libraries can be varied/customised for different industries/businesses.

The work-flow and access can be adjusted to cater for variations in human resource policies and procedures. In addition documents and tools such as survey components, and instruments can all be varied.

System monitoring and support functions can be incorporated, for example automatic notification of system errors.

The system of the present invention can be varied to include disciplinary procedures and documentation.

The system can also include library education and training resources and advisory functions on performance management.

The system can include a means for determining competencies for succession planning and workforce planning.

The system can be implemented on a variety of technological platforms by variation. The system can also easily be adapted dependant on the number of users.

Throughout the description and claims of this specification the word "comprise" and variations of that word, such as "comprises" and "comprising", are not intended to exclude other additives, components, integers or steps.

We claim:

1. A computerized integrated measurement and management system for a management of human resources, comprising:

one of a central and distributed database system that is selectively varied according to needs of each organization, designed to expand a corpus of generic information dynamically with use, distinct from personal information, a centralized or distributed programmed unit, that implements necessary functions of the measurement and management system by interaction with the database and adapted to interact with a community of registered users, the users access the system via one of personal computers and other devices equipped with client software of sufficient interactivity for users to one of personal computers and other devices equipped with client software of sufficient interactivity for users to effect necessary selections and choices in order to select and perform functions delivered by the system, in combination with sub-systems of:

1) performance definition,
2) performance monitoring, and
3) performance development, wherein the performance definition subsystem includes a job description module, a job analysis module and an objective-setting function, the performance definition subsystem having a tool selection module which provides links from individual job descriptions to suitable assessment instruments for selecting candidates best suited to the job description, the job description module creating job descriptions and identifying competencies for each job or role, such competencies being used to produce person specifications for each job or role, the job descriptions and person specifications being created using organizational and employee data, competency dimensions and the responsibilities and tasks for that job, and the job description module automatically generating job descriptions of both new and existing positions, wherein the performance monitoring sub-system consists in a performance database comprising a performance diary, a survey module with survey construction and survey distribution functions and an analysis and reporting function, wherein the performance development subsystem includes a performance diagnostics component, a performance review component which records comments and ratings of individual performance and updates performance expectations, wherein the performance development subsystem also includes a development planning component which sets and updates development plans for individuals/teams and organisational units, wherein the performance development subsystem has means for receiving data from the performance definition subsystem and performance monitoring subsystem and displays the data to users, wherein the system maintains comprehensive current and historical records of all performance related data for each employee or group of employees, and displays them as documents on demand, subject to the system roles of users that control the display and functions available to them using different access rights, wherein the administration module provides a means for human resource staff to update user details, library records, system configurations, moderation and approval procedures, email notifications and reminders, and to monitor an entire process of performance definition, monitoring and development.

2. The system according to claim 1, wherein the job description module allows different users different levels of function depending on the role of the user.

3. The system according to claim 2, wherein the job description module provides means for linking individual employees to job descriptions and person specifications and means for removing them.

4. The system according to claim 1, wherein the job description module provides means for searching for job descriptions already in the system.

5. The system according to claim 1, wherein the job description module includes an editing function.

6. The system according to claim 1, wherein the job description module uses status and version control to control the proliferation, quality and use of the job descriptions.

7. The system according to claim 1, wherein the job analysis module includes task analysis, competency analysis and job evaluation functions.

8. The system according to claim 7, wherein the task analysis function enables identification, categorization, recording and display of key responsibilities and tasks in a role, prior to creation of a formal job description.

9. The system according to claim 7, wherein the competency analysis function includes a survey function which enables identification recording and display of educational qualifications, training, knowledge, abilities, and other personal attributes and skills, actions and behaviors required and the comparison with the actual capabilities of the incumbent for a particular job role; set of responsibilities tasks and expected outcomes.

10. The system according to claim 7, wherein the job evaluation component is a survey which gathers and analyzes data needed for decisions on compensation for jobs and positions, according to multiple criteria.

11. The system according to claim 1, wherein the objective-setting function records agreement of individual, team and organizational objectives.

12. The system according to claim 1, wherein the objective-setting function enables the viewing, drafting, editing, recording, display and approval of objectives at various levels.

13. The system according to claim 1, wherein the objective-setting function links objectives to responsibilities in the job description and to objectives of the parent organizational unit.

14. The system according to claim 1, wherein the objective-setting function prioritizes and weighs objectives.

15. The system according to claim 1, wherein the performance definition sub-system uses status and version control for records entering the database.

16. The system according to claim 1, wherein the performance diary captures and displays information, clearly showing its direct relationship to all performance expectations of employees or groups of employees.

17. The system according to claim 16, wherein the information is obtained from external corporate databases by direct entry from within the organization by employees and managers, and from survey data.

18. The system according to claim 1, wherein the survey module enables the construction and distribution of 360-degree survey instruments.

19. The system according to claim 1, wherein the survey module enables viewing, selecting, editing and creating of library survey instruments, from survey items and response scales, to gain feedback on particular responsibilities, tasks, objectives and competencies for individual employees or groups of employees within the organization.

20. A system as claimed in claim 1, wherein the survey distribution function enables selection of survey respondents, from all appropriate stakeholders of the organisation, internal and external, distributes, collects, analyses and consolidates the survey results.

21. The system as claimed in claim 1, wherein the performance diagnostics component enables identification of causes of performance problems, recommendation of appropriate remedial actions, and provides links to a library of organisational Human Resources policy documents and procedures.

22. The system as in claim 1, wherein the performance review component displays performance reviews, current and historical, and collates all performance expectations and performance data into an integrated display for review by employees and managers and the entry of comments and ratings on the review form, with the option to ensure face to face discussion by entry of employee validation, review by all appropriate parties prior to finalization, and a means to notify payroll of satisfactory performance for movement through pay scales.

23. The system as in claim 1, wherein the performance development subsystem links the performance review and individual development plans for their updating as a result of the performance review process, wherein the individual development plans provide a means for drafting, editing, recording and displaying development resource requirements of an employee or group of employees, identified from performance monitoring and or appraisal, action plans, competency development plans, mentor and buddy arrangements, course enrolments, course completions and any other relevant developmental strategies and actions.

24. The system as claimed in claim 1, wherein the system generates fully formed documents, using templates consistent with the organisation's standards and with content appropriate for the user role.

25. The system as claimed in claim 1, wherein the administration module provides a means for Human Resource staff to update user details, to update library records, to update system configurations such as cycle lengths, moderation and approval procedures, automated email notifications and reminders, and to moderate the process of creating new job descriptions, person specifications, objectives, performance feedback surveys, performance reviews and individual development plans.

26. The system as claimed in claim 1, that enables HR administrators and senior managers to obtain on demand consolidated and individual reports for all aspects of performance and capability expectations, actual individual performance, competency and capability.

* * * * *